(12) United States Patent
Silverman et al.

(10) Patent No.: US 10,771,828 B2
(45) Date of Patent: Sep. 8, 2020

(54) CONTENT CONSENSUS MANAGEMENT

(71) Applicant: Free Stream Media Corporation, San Francisco, CA (US)

(72) Inventors: Jeffrey Michael Silverman, San Francisco, CA (US); Pedro Miguel Duarte Gelvez, San Francisco, CA (US)

(73) Assignee: Free Stream Media Corp., San Francisco, CA (US)

( * ) Notice: Subject to any disclaimer, the term of this patent is extended or adjusted under 35 U.S.C. 154(b) by 0 days.

(21) Appl. No.: 16/134,227

(22) Filed: Sep. 18, 2018

(65) Prior Publication Data
US 2020/0092592 A1 Mar. 19, 2020

(51) Int. Cl.
*H04H 60/29* (2008.01)
*H04N 21/24* (2011.01)
*H04N 21/234* (2011.01)
*H04N 21/81* (2011.01)
*G06N 3/08* (2006.01)
*G06F 16/71* (2019.01)
*G06F 16/783* (2019.01)
*H04L 9/06* (2006.01)

(52) U.S. Cl.
CPC ......... *H04N 21/2407* (2013.01); *G06F 16/71* (2019.01); *G06F 16/783* (2019.01); *G06N 3/08* (2013.01); *H04N 21/23418* (2013.01); *H04N 21/812* (2013.01); *H04L 9/0643* (2013.01)

(58) Field of Classification Search
CPC ............. H04N 21/2407; H04N 21/812; H04N 21/23418
USPC .......................................................... 725/22
See application file for complete search history.

(56) References Cited

U.S. PATENT DOCUMENTS

| | | | |
|---|---|---|---|
| 6,889,325 B1 * | 5/2005 | Sipman | G06Q 20/04 380/268 |
| 2002/0072982 A1 * | 6/2002 | Barton | G06Q 30/02 705/14.1 |
| 2002/0083060 A1 * | 6/2002 | Wang | G10L 17/26 |
| 2004/0229599 A1 | 11/2004 | Quick, Jr. et al. | |
| 2005/0028195 A1 * | 2/2005 | Feinleib | H04N 7/163 725/32 |
| 2005/0192863 A1 * | 9/2005 | Mohan | G06Q 30/0277 705/14.19 |

(Continued)

OTHER PUBLICATIONS

International Search Report and Written Opinion issued in co-related International Application No. PCT/US2019/039524 dated Oct. 2, 2019.

(Continued)

*Primary Examiner* — Michael B. Pierorazio
(74) *Attorney, Agent, or Firm* — Hogan Lovells US LLP (57) ABSTRACT

A consensus-based approach can be used to determine content that was provided by one or more sources over a period of time. Devices receiving or obtaining the content can analyze the content to generate a fingerprint or other representation of the received content. The fingerprint data from the various devices can be aggregated and analyzed to determine whether a consensus can be reached as to an identity of the content that was received. Information for the identified content can then be used to generate a schedule of times at which various instances of content were provided by the one or more sources.

20 Claims, 6 Drawing Sheets

(56) References Cited

U.S. PATENT DOCUMENTS

| | | | |
|---|---|---|---|
| 2006/0224452 A1* | 10/2006 | Ng | G06Q 30/02 705/14.14 |
| 2006/0256133 A1* | 11/2006 | Rosenberg | G06F 3/013 345/619 |
| 2007/0071330 A1 | 3/2007 | Oostveen et al. | |
| 2007/0124756 A1* | 5/2007 | Covell | G06Q 30/02 725/18 |
| 2007/0179850 A1* | 8/2007 | Ganjon | G06Q 30/00 705/14.27 |
| 2009/0313670 A1* | 12/2009 | Takao | H04N 5/44591 725/110 |
| 2010/0114713 A1* | 5/2010 | Anderson | G06Q 20/10 705/14.69 |
| 2011/0273455 A1* | 11/2011 | Powar | G10H 1/368 345/473 |
| 2012/0295560 A1* | 11/2012 | Mufti | H04B 13/00 455/95 |
| 2012/0297400 A1* | 11/2012 | Hill | G06F 16/748 719/318 |
| 2012/0316969 A1* | 12/2012 | Metcalf, III | G06Q 30/0269 705/14.66 |
| 2013/0029762 A1* | 1/2013 | Klappert | G06Q 30/02 463/31 |
| 2013/0031579 A1* | 1/2013 | Klappert | H04N 21/454 725/32 |
| 2013/0042262 A1* | 2/2013 | Riethmueller | G06F 16/74 725/14 |
| 2013/0044051 A1* | 2/2013 | Jeong | H04N 21/4126 345/156 |
| 2013/0067512 A1* | 3/2013 | Dion | G06Q 30/02 725/34 |
| 2013/0071090 A1 | 3/2013 | Berkowitz et al. | |
| 2013/0073366 A1* | 3/2013 | Heath | G06Q 30/0261 705/14.25 |
| 2013/0073377 A1* | 3/2013 | Heath | G06Q 30/02 705/14.39 |
| 2013/0080242 A1* | 3/2013 | Alhadeff | G06Q 30/0239 705/14.39 |
| 2013/0080262 A1* | 3/2013 | Scott | G06Q 10/109 705/14.68 |
| 2013/0085828 A1* | 4/2013 | Schuster | G06Q 30/0207 705/14.25 |
| 2013/0111519 A1* | 5/2013 | Rice | G06Q 30/02 725/34 |
| 2013/0124073 A1* | 5/2013 | Ren | G08G 1/00 701/118 |
| 2013/0297737 A1* | 11/2013 | Wajs | G06F 21/10 709/217 |
| 2014/0289315 A1 | 9/2014 | Harrison | |
| 2014/0369413 A1 | 12/2014 | Clark | |
| 2015/0227922 A1* | 8/2015 | Filler | G06Q 20/367 705/41 |
| 2016/0112770 A1 | 4/2016 | Harrison | |
| 2016/0248870 A1 | 8/2016 | Tsukagoshi | |

OTHER PUBLICATIONS

Garcia et al., "Semantic Integration and Retrieval of Multimedia Metadata", SemAnnot@ ISWC 2005, retrieved on Sep. 1, 2019 from http://ceur-ws.org/Vol-185/semAnnot05-07.pdf.

* cited by examiner

CONTENT CONSENSUS MANAGEMENT

BACKGROUND

As electronic devices become increasingly sophisticated and widely available, people are using such devices to view and consume content at greater rates. Further, there is an ever-increasing variety of sources producing or providing this content. In at least some instances, this content is provided in a stream or live broadcast for which there may be no set schedule. In other instances, there may be a schedule of the primary content that was broadcast, or scheduled to be broadcast, but no actual log or record that indicates the secondary content or other content that was provided and/or viewed at various times over a plurality of channels or sources.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to controlling playback of media content. In particular, various approaches provide for using a voice communications device to control, refine, or otherwise manage the playback of media content in response to a spoken instruction.

As mentioned, it can be desirable in many instances to determine or identify content that is provided through a stream, broadcast, download, or other such source. While broadcasts of primary content will often have fixed schedules, the secondary content provided can vary or be flexible in its selection. Further, there may be adjustments in the programming due to news or other occurrences. There are other sources of content as well, such as live broadcasts or video streams, for which there may not be a fixed schedule, or potentially any schedule. For a video download, for example, there might be secondary content displayed alongside the primary content requested, but the secondary content is determined dynamically for that particular download or stream. For a provider of an instance of secondary content, such as an advertiser, it can be difficult to track when and where the instance was displayed or otherwise made available across the various devices and offerings of content.

Figure 1:
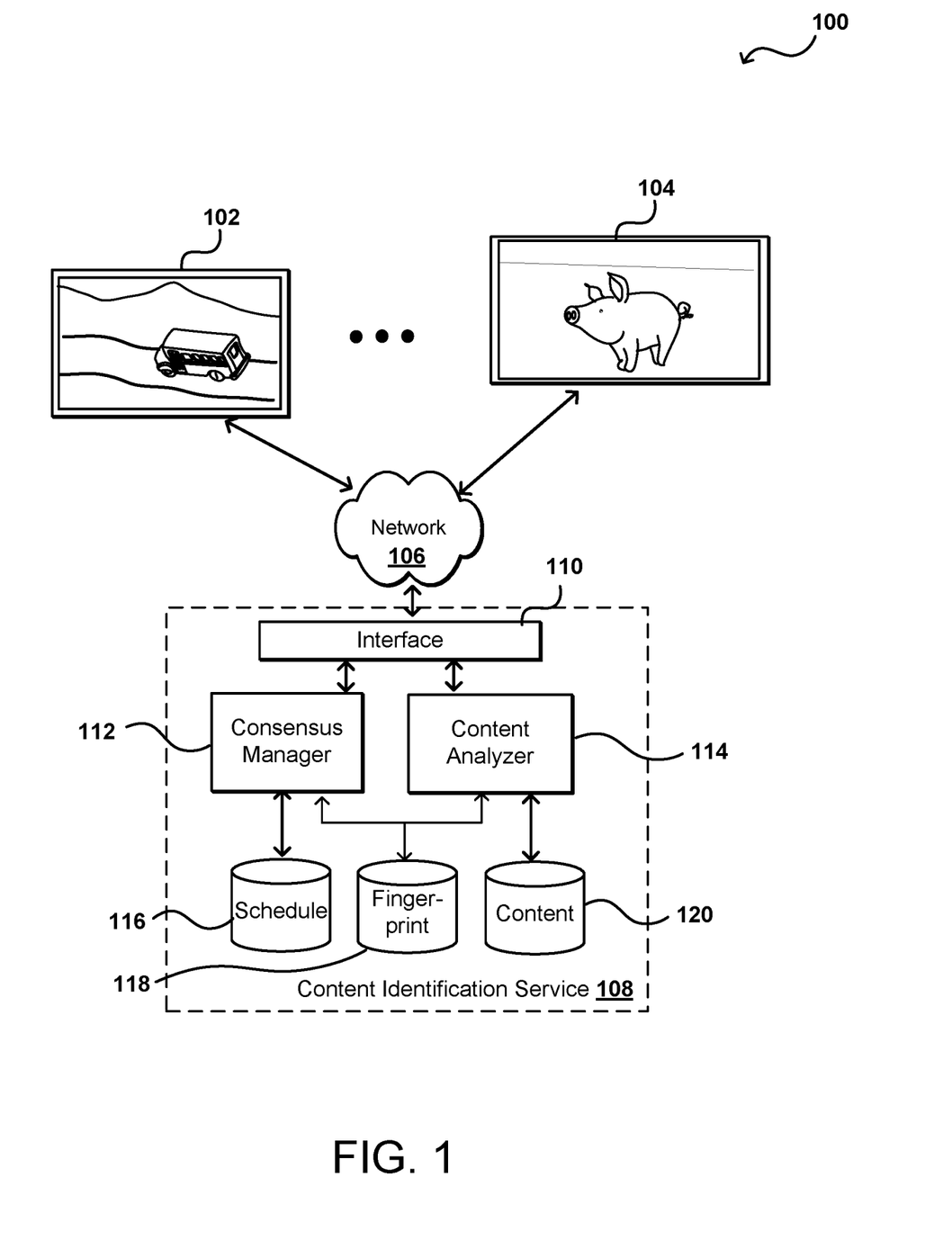
FIG. 1 illustrates an example environment in which aspects of the various embodiments can be utilized.

FIG. 1 illustrates an example environment 100 in which aspects of the various embodiments can be implemented. In this example, there are two different user devices 102, 104 each displaying (or otherwise consuming) different content at a specific point in time. These can be similar or different types of devices associated with the same or different users at similar or different geographic locations in accordance with the various embodiments. As discussed elsewhere herein, in various embodiments the user devices 102, 104 can include software and/or hardware that performs at least some level or type of recognition for content consumed via those devices. Various user devices may have limited resources, such as limited memory or processing capability, that may be limited by physical characteristics or by a provided of the devices for use by third parties, among other such options. While the accuracy of the determinations may be less than would be possible without such constraints, the ability to aggregate content data from a large number of user devices can help to improve the determination accuracy in most cases.

In various embodiments, user devices can include devices such as televisions, monitors, wearable devices, smart phones, tablets, handheld gaming devices, and the like may include display elements (e.g., display screens or projectors) for displaying consumer content. This content may be in the form of television shows, movies, live or recorded sporting events, video games, and the like. Typically, the devices are agnostic or unaware of the type of content being rendered, but rather, merely operate to render and display the content as instructed. In various embodiments, the user devices may operate in tandem with other devices. For example, a television may be connected to a receiver, which may receive inputs from other devices such as set top boxes, gaming systems, multimedia streaming devices, and the like, which the receiver routes to the television for display to the consumer.

In various embodiments, a user device may include an embedded chipset utilized to identify content being displayed on the user device, which may be referred to as Automatic Content Recognition (ACR). The chipset may be utilized to receive the content feed being transmitted to the user device, for example a streaming media feed or a feed from a set top cable box. Furthermore, in various embodiments, the chipset may extract or otherwise identify certain frames from the media stream for later processing and recognition. Identification may be facilitated by using a fingerprint made up of a representation of features from the content. For example, software may identify and extract features and compress the characteristic components thereby enabling unique identification by the fingerprint. In various embodiments, a one-way hash of the fingerprint may be created, such as by using a Secure Hash Algorithm (SHA) or other such hashing algorithm or process. This hash may then be compared with a database of content to facilitate recognition. This database may include feature vectors and/or machine learning techniques to facilitate robust, quick matching. It should be appreciated that multiple fingerprints may also be utilized in the identification process. In various embodiments, the fingerprints may be related to individual frames or images and/or auditory segments. In the example of FIG. 1, the information sent from the various user devices 102, 104 can include the fingerprints generated by the various devices, which can then be used to perform the content recognition against a larger database than would otherwise be able to be stored on the individual user devices.

While various embodiments include an embedded chipset for performing ACR, in other embodiments ACR may be performed without an embedded chipset. For example, ACR may be performed utilizing an application that may include software code stored on a second user device. For example, if a user where watching content on a television the user may incorporate a second user device, such as a smartphone, to take an image of the screen or receive a portion of audio from the content. Thereafter, the image or audio content may be utilized similarly as described above to identify the content displayed on the screen. In at least some embodiments the viewership data obtained by these devices can be aggregated and provided to entities interested in such data. The aggregated data enables content viewership to be measured and analyzed in various ways.

In the example environment 100 of FIG. 1, the data can be sent from the various devices 102, 104 across at least one network 106, such as may include the Internet, a cellular network, a local area network, and the like. The types of network connections utilized can vary depending at least in part upon the capabilities of the respective devices. The information can be received to an interface layer 110 that can include application programming interfaces (APIs) and other interfaces that enable requests to be received and directed accordingly. The interface layer 110 can include other components as well, such as firewalls, routers, network switches, and the like. The user information can be provided to a content analyzer 114 in this example, which can take the received data and attempt to determine the corresponding content represented by the data. If the data includes one or more content fingerprints, then the content analyzer 114 can compare the fingerprint data against fingerprint data stored in a fingerprint repository 118 that is associated with specific instances of content. If the data includes other types of data, such as screen shots or feature vectors, that data might be compared against data in a content repository 120, where content determinations can be made using various image matching or computer vision processes. Various other approaches can be used as well as discussed and suggested herein.

The content identifications can be made available to a component (or system or service, etc.) such as a consensus manager 112. The consensus manager can input the data, aggregate related data, and analyze the aggregated data to attempt to come to a consensus as to the content that was provided from a certain source at a certain time, or on a certain stream or broadcast at a certain time, among other such options. The consensus manager can attempt to determine a consensus value for the various time and source options, and can store this information to a schedule repository 116 or other such location. An entity interested in viewings or presentations of a particular instance of content can then submit a request to the content identification service 108 to obtain information such the number of presentations, sources of the presentation, locations for presentation, etc. Further, a content provider might be able to obtain a schedule for a period of time that includes content information for one or more sources over that period of time.

As mentioned, secondary content (or other types or classifications of content) can be difficult to identify in many situations, and not just due to the large number of instances or potentially short duration of the content. In some embodiments there can be many variations, such as many different trailers for a movie, where many of the shots or contents of the trailers will be similar but actually correspond to different versions, which may be important for certain tracking entities. Some instances may also have very few recognizable features or poor lighting. Similarly, instances of secondary content may come from a large number of sources, such that there may not be a "verified" example of that content to use for comparison or determination. There can also be different versions based on factors such as geographic location, time, type of device displaying the content, type of viewer consuming the content, and the like.

In one embodiment, the components in the content identification service 108 box of FIG. 1 can represent one of a number of capture stations, which might all be associated with the same provider or different providers in various embodiments. A capture station can receive feeds, streams, or broadcasts from multiple sources, as well as being able to receive fingerprints and other data from various user devices. A received stream in some embodiments can be divided or portioned into media segments, with approaches in at least some embodiments attempting to also determine which segments correspond to secondary content. Data in the various segments can then be compared against data in one or more content repositories to attempt to identify the content, and the timing of the segments related to that content can then be added to, or otherwise used to update, the corresponding content schedule.

As mentioned, in some embodiments a database of content information can be maintained that can be used for content identification. This can include, for example, a set of fingerprints as discussed above that can be used for matching, as two fingerprints generated for an instance of content using the same fingerprinting algorithm should generate substantially the same fingerprint in at least some embodiments. As mentioned, different devices may recognize different features in the content that are used to generate the fingerprints, which can result in an incomplete match in various instances. Using a client-side implementation where the content is analyzed on the user device can ensure that the proper content is being processed, but can provide less accurate results as discussed herein. The user device can analyze the content as received to attempt to determine the presence of various live annotation events. The events can indicate information such as the start or stop point (or time, etc.) for secondary content, or other specific types of content, in the media. Certain broadcasts can include metadata or tags indicating the start or stop of secondary content, while other approaches rely upon features such as scene breaks, changes in volume or sound, and the like.

As mentioned, the data can indicate content that was detected on a stream or broadcast, or from another such source. In can indicate, for example, the content that was presented on a specific stream at a specific time, or can provide information as to all times and/or channels on which the content was displayed. It can also provide information as to the number of viewings across all monitored sources over a period of time. As mentioned, however, the media can be analyzed on the individual devices, which can provide for some inaccuracies due to limited resources. In other instances, there may be adequate resources but the ability to access those resources is restricted so as to not interfere with the viewing experience or other types of functionality on the device. The volume of data points, however, will help to remove various inaccuracies and generate consensus-based determinations for the various instances of content. Various statistical analysis approaches can be utilized to determine the content provided to various user devices as specific points in time, or from specific sources, etc.

In some embodiments an algorithm can process content information, such as a normalized content history (NCH), across various user devices. The NCH can include information for any user device that is consuming content and for which the information is provided or available. The information can be broken down by any appropriate metric, such as by channel, stream, or source. An instance of content can be analyzed to determine various features or aspects of the content, such as including specific images or image features, having specific identifiers, etc. As mentioned, in some embodiments the information provided can be a fingerprint for the content, an identifier for the channel or source, and a timestamp, among other such options. The fingerprints can be used to identify the reported content, where possible. The algorithm can then attempt to build a consensus as to the identified content, such as where a statistically significant portion of the reporting user devices confirmed the same content instance. This may be a fixed minimum number in some embodiments, or a percentage of the reporting devices, or a combination thereof, among other such options. Each instance of data can also be tied to a specific device identifier in some embodiments, in order to better track viewership data as well as to ensure that data from a specific device is only counted at most once towards the consensus.

Figure 2:
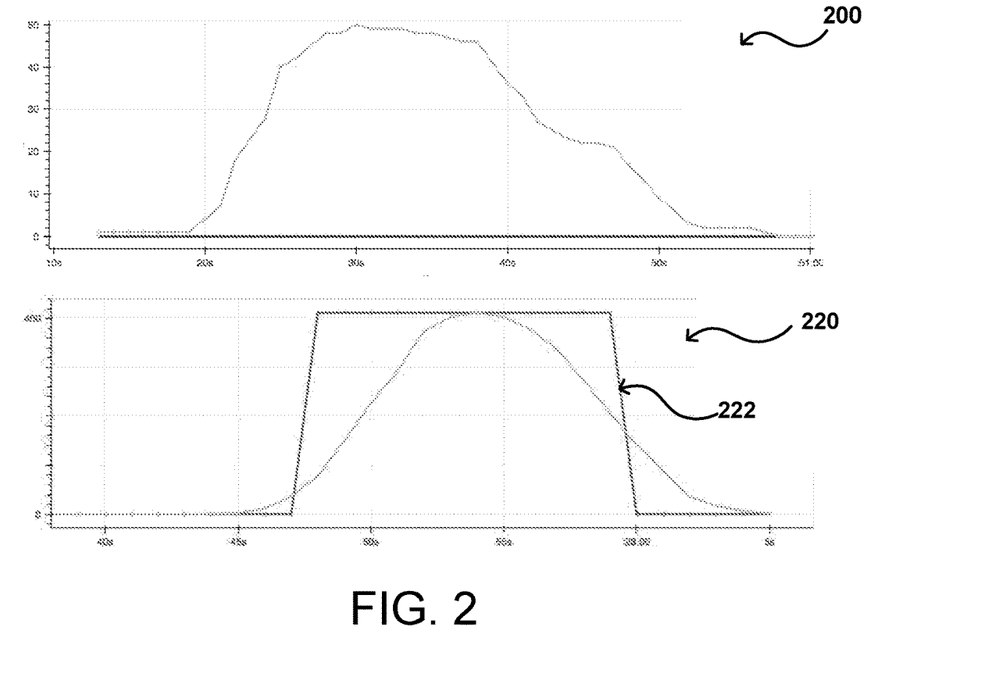
FIG. 2 illustrates example data plots used for building consensus that can be utilized in accordance with various embodiments.

In one example, the NCH content data is grouped by channel, content identifier, and timestamp. The number of user devices associated with the data in each group can be counted. The algorithm can then look for peaks or other features in the data that likely correspond to airings of secondary content, such as advertising. FIG. 2 illustrates a set of plots 200, 220 of NCH data that can be collected and analyzed within the scope of the various embodiments. As discussed, different devices may have different capabilities and processes for generating content data. This can include, for example, different sampling times or rates, as well as different feature determination processes. The data reported for a given group (channel, identifier, and timestamp) is illustrated in the top plot 200. As illustrated, there is a ramp up and ramp down period that may correspond to noise in the data, as well as differences in receiving time and reporting time. For example, there may be different latencies in different devices receiving the data, or slight variations in time determinations, that can account for differences in start and stop time reporting. As illustrated, however, there is a distinct peak where a number of devices have locked to the same secondary content. The data can be analyzed using a content determination algorithm, or other such process, to fit a "square wave" type function 222 to the curve, as illustrated in the bottom plot 220. Here, there will be relatively well-defined start and stop times, as well as a duration during which the content aired with at least some level of consensus or certainty. The various parameters and functions can be adjusted in order to determine the optimal functions to fit to the data in accordance with various embodiments. In some embodiments, the flat top portion of the square wave can be determined to be the duration of the received secondary content. If the value of this flat top is above a minimum threshold, or satisfies another consensus criterion, then the secondary content can be confirmed for that channel over that time.

Figure 3:
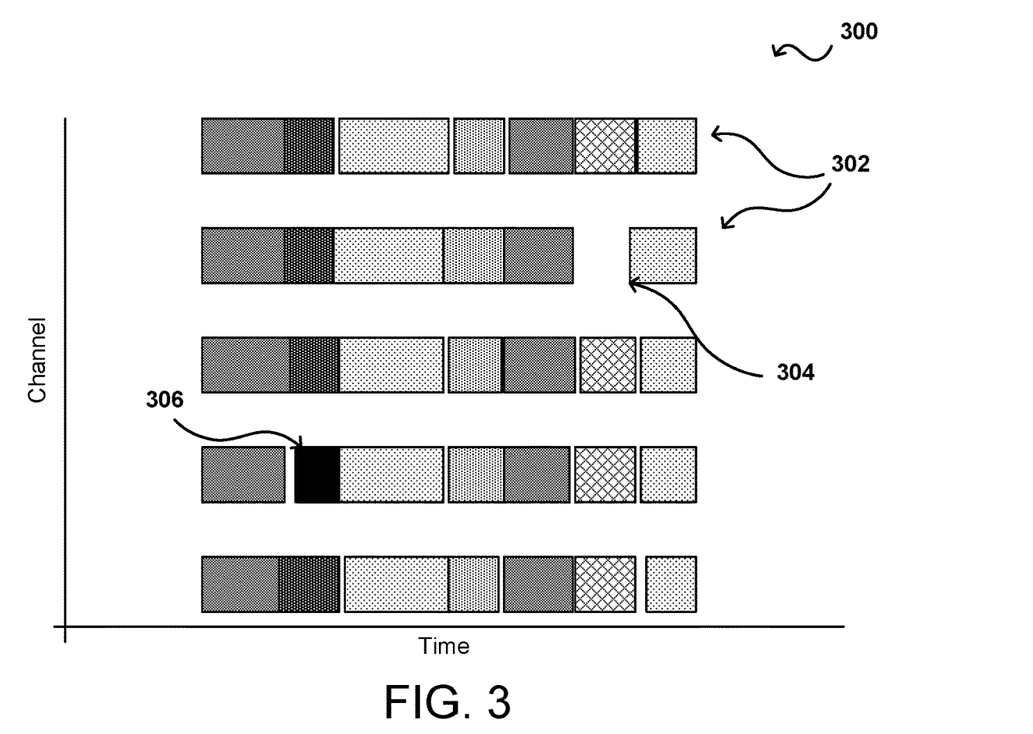
FIG. 3 illustrates example content detections for a window of time across multiple content sources that can be generated in accordance with various embodiments.

This information can then be used to generate a schedule or history of content airings or presentations over time for a number of different sources. For example, FIG. 3 illustrates a schedule 300 that can be generated using such a process in accordance with the various embodiments. In this example, each horizontal bar 302 represents a different channel, and variations in the color of the bar represent different instances of content broadcast over that channel over a period of time, with time increasing from left to right across the schedule. From top to bottom, if all channels are broadcasting the same content then the content blocks over that period should have the same general pattern or color, indicating the same identified content, with approximately the same start time, stop time, and duration. If these channels are all affiliates of the same broadcasting company, it can be seen that there is consistency in the determination across the channels. There may be occasions 306 where different content is determined, which may be due in part to an ability of a channel to broadcast local programming during certain periods of time. There may also be different identifiers for similar commercials, such that a given commercial might receive multiple consistent identifications. There may also be periods 304 without consensus data, where either the content could not be identified or no consensus was able to be reached. Such data can help to ensure that affiliates are presenting the correct content, as well as to determine how many times or channels were used to broadcast an instance of content, such as to ensure fulfillment of a content provider agreement.

And while secondary content is used as an example, it should be understood that such approaches can be used to determine the presentation or providing of other types of content as well. This can include, for example, primary programming over that period. It can also include content inside primary or secondary content, such as the appearance of a person or place in the primary content that can be identified from the video data. Audio or other media content can be analyzed using such approaches as well within the scope of the various embodiments.

Further, although automated content recognition (ACR) is discussed as a primary example, it should be understood that other fingerprinting or content recognition processes can be used as well with various embodiments. For example, a fingerprinting algorithm can analyze a subset of frames over a period of time to determine information about the pixels in those frames. A hash function can be applied to the pixel values of the frames, which can then be used to attempt to locate matching functions in a library of hash values. In some embodiments, various regions of the image frames can be analyzed and a fingerprint generated based on those regions, which can include all regions or a subset of possible regions. The fingerprint may be generated based on a mathematical calculation for each region, such as may relate to the pixel values for each region, with each region representing a point or feature in the fingerprint. In other approaches, hashes may be calculated for specific regions of an image frame, with these hashes used to generate the respective fingerprint. A match may not need to be an exact match in all instances, such as where the content may be available in multiple formats, or there may be multiple fingerprints stored for different versions or formats of a single instance of content. A schedule 300 such as that illustrated in FIG. 3 can be referred to as including a set of match segments, where segments are aggregated together for the same content and illustrated as a single instance from the start to the stop of each presentation instance. In order to reduce the presence of noise in the data, but high frequency and low frequency analysis can be performed on the data, with high and low frequency aspects being merged to obtain the best combination of data for each segment.

In some embodiments, very little processing or analysis of the content is performed on the user or client devices themselves, for reasons including those discussed previously. In these embodiments, the hardware and/or software on the devices can analyze the content and generate respective hash values or fingerprints that are representative of the content. The hashes or fingerprints can then be sent to a content management service or other such entity for analysis. In some embodiments the hashes can be generated for a subset of frames, such as every fifth or tenth frame for a thirty- or sixty-frames per second instance, or even all frames in some embodiments, resulting in multiple hashes being sent per second. The content management service then determines the appropriate device ID for each hash, determines the match for the hash, and stores that information for the appropriate timestamp for aggregation and analysis.

Once generated, the schedules or historical tracking data can be used for a number of different purposes. For example, content providers can obtain determinations of the number of times their content was broadcast or consumed, which can be important metrics for demographics, advertising, cost structuring, service level agreement compliance, and the like. The information can also be provided to broadcasters to ensure that they are complying with such agreements. Information can also be valuable to advertisers and other entities who needed to decide when, where, and how often to advertise, as well as how much return they are getting on their advertising spend. Such data can also provide information about the approximate number of viewers who were exposed to specific advertising or content, in order to determine a resulting impact on behavior, whether viewing or purchasing behavior, among other such options. If exposed or able to be made available, information about advertising trends of other companies may also be useful in determining advertising strategies or content placement, etc. This information can also be valuable to primary content providers who are interested in the secondary content that is being displayed with their primary content, as a provider may want "appropriate" secondary content to be displayed so as to not inadvertently turn viewers off to the primary content.

In at least some embodiments the fingerprint database will be populated with at least some amount of human intervention. This can include, for example, a user providing identifying information with a copy of the content, or a user viewing the content and providing or verifying identity information for the content. This can include, for example, an employee charged with reviewing content and inputting identifying information. A fingerprint of the content can then be generated and associated with the identifying information. Subsequently, when a matching fingerprint is received from a user device or other such source, the matching fingerprint can be located and the identifying information determined.

Figure 4:
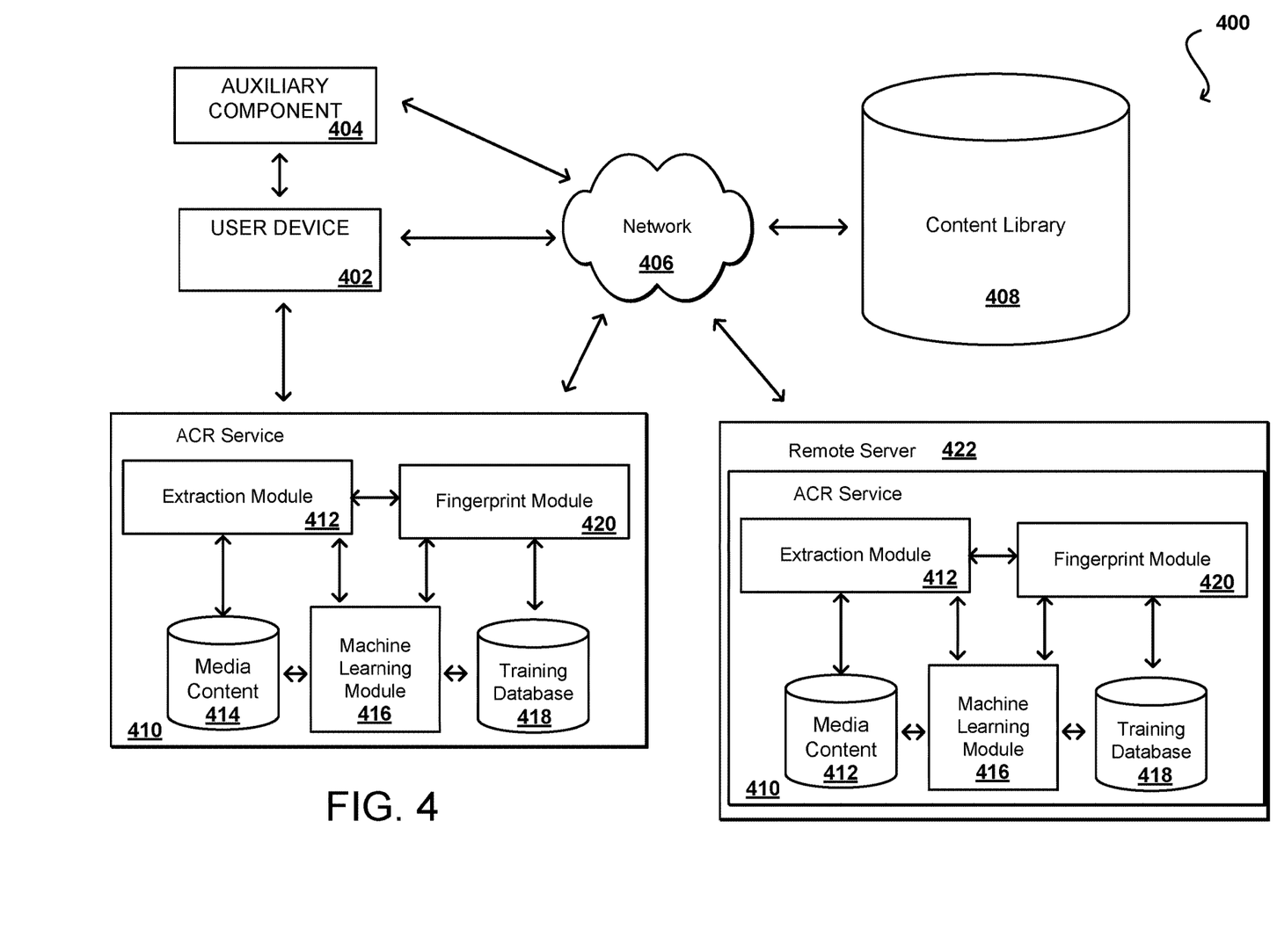
FIG. 4 illustrates an example system for identifying viewership data that can be utilized in accordance with various embodiments.

FIG. 4 illustrates an example system 400 that can be used to obtain viewership data from a user device. Example data flows are illustrated between a user device 402, a network 406, and associated components. It should be noted that additional services, providers, and/or components can be included in such a system, and although some of the services, providers, components, etc. are illustrated as being separate entities and/or components, the illustrated arrangement is provided as an example arrangement and other arranged as known to one skilled in the art are contemplated by the embodiments described herein. The illustrated system 400 includes the user device 402 and associated auxiliary components 404. As described above, the user device 402 may include a television, personal computing device, laptop, tablet computer, or other such device. Furthermore, the auxiliary components 404 may include surround sound speakers, sound bars, set top cable boxes, streaming service boxes, and the like. In the illustrated embodiment, the user device 402 and/or the auxiliary components 404 may be in communication with a network 406. The network 406 may be configured to communicate with the user device 402 and/or the auxiliary components 404 via a wired or wireless connection. It should be appreciated that the network 406 may be an Internet or Intranet network that facilitates communication with various other components that may be accessible by the network 406. In the illustrated embodiment, the network 406 communicatively couples the user device 402 to a content library 408. The content library 408 may represent one or more streaming services, television services, music services, or the like. Furthermore, while the illustrated embodiment shows the network 406 coupling the content library 408 to the user device 402, it should be appreciated that the content library 408 may be acquired via over-the-air or wired communication protocols, such as an antenna or a coaxial cable arrangement.

In various embodiments, the user device 402 may be equipped with an ACR service 410, such as via an embedded chipset, an application running on the user device 402, or the like. As described above, the ACR service 410 facilitates identification and fingerprinting of content rendered on the user device 402. For example, the ACR service 410 may include an extraction module 412 which is utilized to grab or otherwise obtain screen shots, video segments, auditory clips, or the like from the content displayed or otherwise utilized by the user device 402. The illustrated extraction module 412 is communicatively coupled to a media content database 414, which may include content available for consumption via the user device 402. The media content database 414 may be utilized in order to compare and identify the media content associated with the extracted information. For example, the media content database 414 may include screen shots or video capture segments from various content that can be evaluated and compared to the extracted information, for instance utilizing one or more machine learning or artificial intelligence techniques. In various embodiments, the media content database 414 may include particular segments from content, such as opening credits which enables robust matching. In other embodiments, the media content database 414 may include images or auditory samples from various actors associated with media content in order to identify or narrow down a range of potential matching content. It should be appreciated that in various embodiments the media content database 414 may not be integrated into the ACR service 410 and may be accessible via a remote server, as will be described below.

The illustrated ACR service 410 further includes a machine learning module 416. In various embodiments, the machine learning module 416 may obtain information from the extraction module 412, the media content database 414, a training database 418, or various other sources. The machine learning module 416 may include various types of models including machine learning models such as a neural network trained on the media content or previously identified fingerprints. Other types of machine learning models may be used, such as decision tree models, associated rule models, neural networks including deep neural networks, inductive learning models, support vector machines, clustering models, regression models, Bayesian networks, genetic models, various other supervised or unsupervised machine learning techniques, among others. The machine learning module 416 may include various other types of models, including various deterministic, nondeterministic, and probabilistic models. In various embodiments, the machine learning module 416 is utilized to quickly categorize and identify content associated with the extracted information. The neural network may be a regression model or a classification model. In the case of a regression model, the output of the neural network is a value on a continuous range of values representing potential content associated with the extracted information. In the case of a classification model, the output of the neural network is a classification into one or more discrete classes. For example, the output representing the extracted information may be classified as "sports", "movie", or "video game" with respect to the content associated with the extracted information. In various embodiments, as weight or confidence factor may be associated with the prediction or identification from the machine learning module 416. For example, a prediction with high confidence may receive a larger associated weight value than a prediction with low confidence.

In various embodiments, the ACR service 410 further includes a fingerprint module 420. The fingerprint module 420 may acquire information, for example from the machine learning module 416 or the extraction module 412 in order to identify the content associated with the user device 420. In the illustrated embodiment, the fingerprint module 420 transmits information to the training database 418. In various embodiments, the successfully identified fingerprints from the fingerprint module 420 may be utilized as ground truth information when training the model associated with the machine learning module 416. Accordingly, the associated ACR service 410 may be utilized to identify content rendered on the user device 402.

In the illustrated embodiment, a remote server 422 also incorporates the previously described ACR service 410. For example, in various embodiments the ACR service 410 may not be embedded within the user device 402, and rather, may be accessible via the network 406. Further, as described above, various components may not be incorporated as illustrated in FIG. 4 in all embodiments. For example, the ACR service 410 embedded within the user device 402 may include the extraction module 412, but may transmit the information, via the network 406, to the remote server 422 for further processing.

Figure 5A:
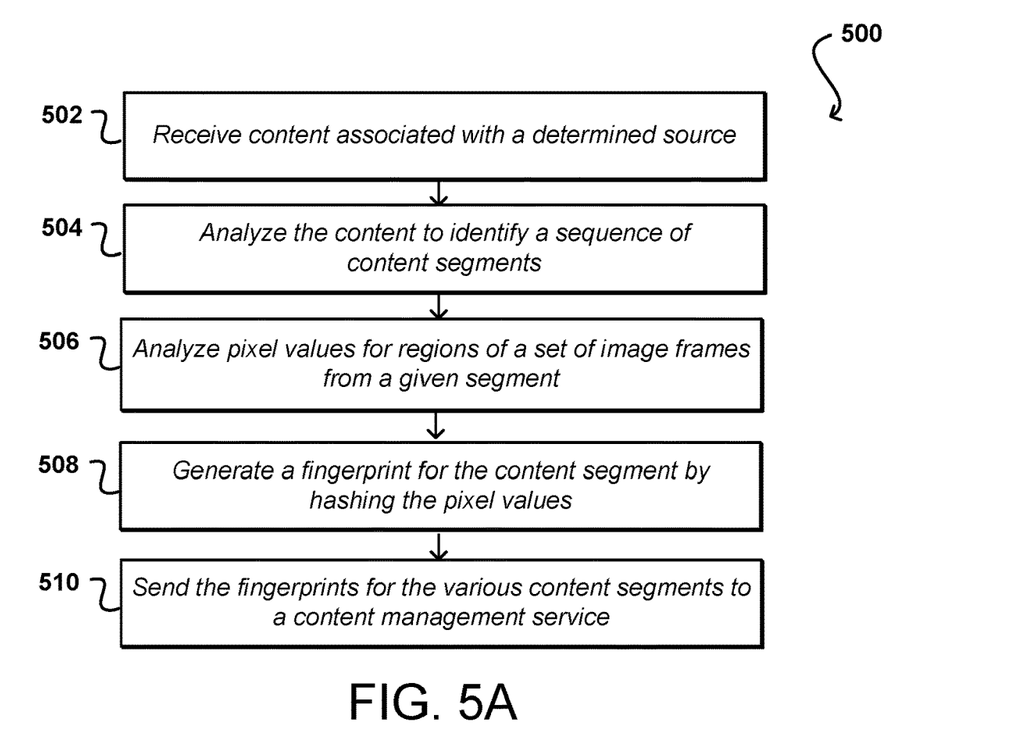
FIGS. 5A and 5B illustrate portions of an example process for identifying content presented using a user device that can be utilized in accordance with various embodiments.

FIG. 5A illustrates an example process 500 for determining a content schedule that can be utilized in accordance with various embodiments. It should be understood that, for any process discussed herein, there can be additional, fewer, or alternative steps performed in similar or alternative orders, or in parallel, within the scope of the various embodiments. In this example, the steps are performed by a system or device such as a user device or client device, that is presenting the content to one or more users, such as a television or tablet computer. The steps can also be performed by an ACR service or other such entity that receives a copy of the content to be analyzed, among other such options. In this example, the device receives 502 content associated with a determined source. As mentioned, this can include receiving a broadcast of content from a television broadcaster or a stream of content from a media provider, among other such options. The content can be analyzed 504 to identify a sequence of content segments. As discussed, this may correspond to separate instances of content that are separated by breaks, shot or scene changes, and the like, or that may be identified by metadata or tags in, or associated with, the content. For a broadcast, the individual segments may correspond to scenes of a show as primary content, as well as individual commercials or news breaks as instances of secondary or supplemental content. The content can be analyzed in any of a number of different ways, but in this example the pixel values for various regions of a set of image frames of each content segment can be analyzed 506. This can include, for example, determining average pixel values or functions of the pixel values for the various regions to generate representations of the analyzed frames. The results from the various regions can then be used to generate 508 fingerprints for the respective content segments. This can include, for example, applying a hashing algorithm to the results to generate a hash value that is representative of the pixel values in the various regions. Such an approach can utilize an algorithm that produces consistent fingerprints for an instance of content, which provides for content identification based upon fingerprint matching as discussed herein. As discussed, the functionality for making these determinations can be integrated into a user device, for example via a chip set or application, that extracts or captures images, videos, and/or audio rendered or displayed via the user device, and generates the respective fingerprints or representations. The fingerprint data can then be sent 510 for the various content segments to a content management service or other such entity for analysis, along with other relevant data such as device identifier, source ID, timestamp data, and the like.

Figure 5B:
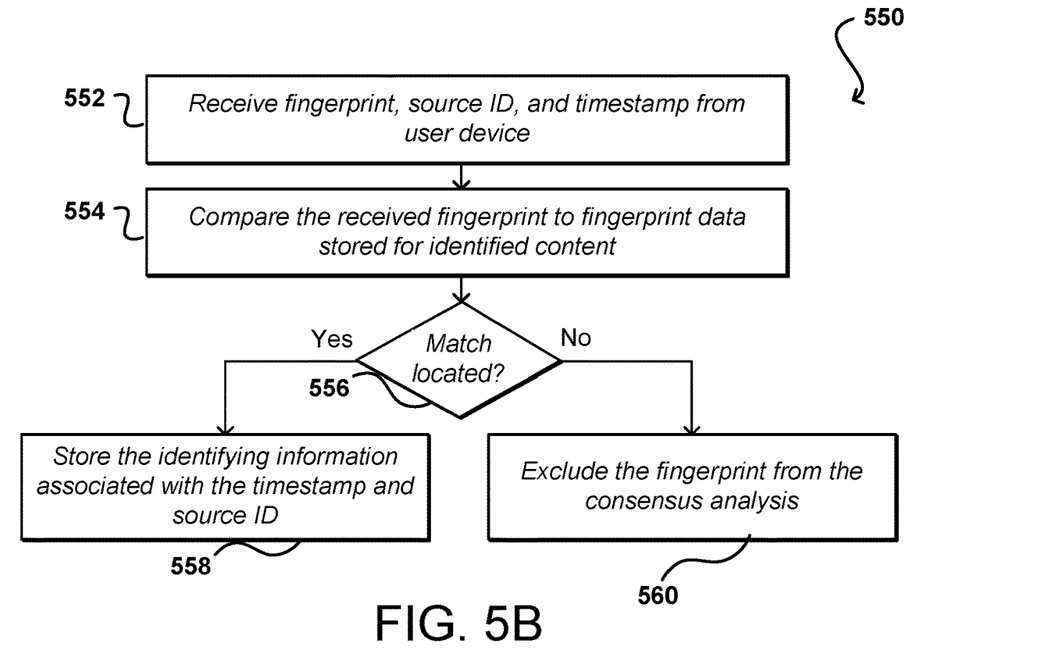

FIG. 5B illustrates an example process 550 for identifying content based at least in part upon the generated fingerprint data that can be utilized in accordance with various embodiments. In this example the steps are performed by a content management service receiving the fingerprint data, but it should be understood that at least some of these steps could be performed on the device receiving the content, or another such system or service, as well within the scope of the various embodiments. In this example, the fingerprint data is received 552, along with potentially other relevant data such as source ID, timestamp data, and the like. Each instance of received fingerprint data can be compared 554 in this example to fingerprint data stored for identified content, such as in a content library or fingerprint repository. The data can be compared until it can be determined 556 as to whether a match has been located. As discussed, some embodiments may require an exact match while others will apply a minimum similarity threshold or other such criterion to determine that two fingerprints match with an acceptable level of confidence. If a confident match is located, the identifying information for the content can be stored 558 with the timestamp data and source ID, and potentially a device ID, as an indication that the identified content was identified by a specific device as having been provided by the source ID at a specific time. If a match cannot be determined, the fingerprint data can be excluded 560 from a subsequent consensus analysis, although in some embodiments additional processing may be performed to attempt to identify the content. In some embodiments, machine learning may be used to apply facial recognition or character recognition to extract identifying information and match the rendered content against a library of information.

Figure 6:
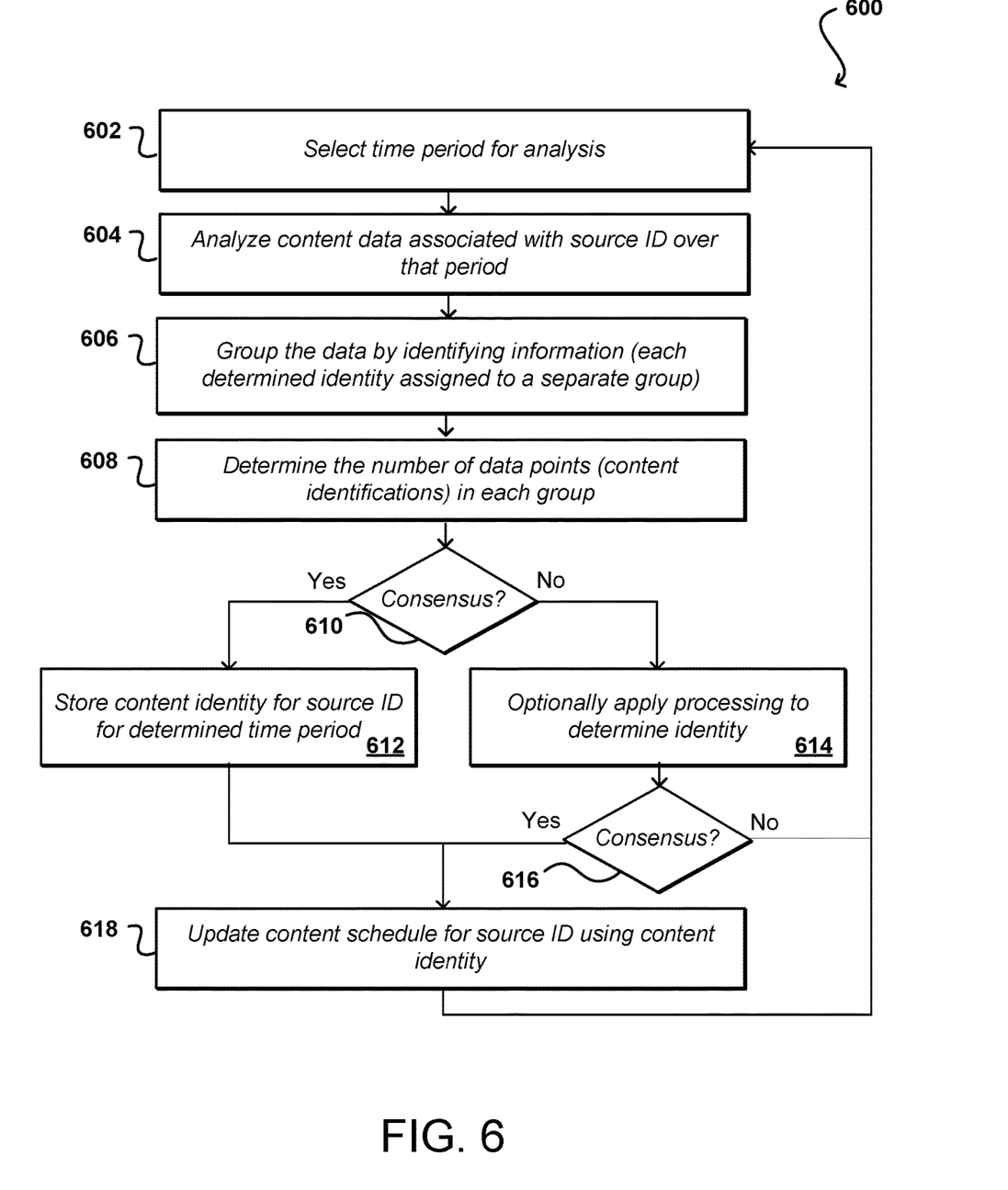
FIG. 6 illustrates an example process for generating a consensus as to content provided by a determined source that can be utilized in accordance with various embodiments.

FIG. 6 illustrates an example process 600 for consensus-based determinations of content presentations that can be utilized in accordance with various embodiments. In this example, a time period for analysis is determined 602. This may be any appropriate time period, such as a specific time, a window on the order of tens of seconds, or a window on the order of minutes, among other such options. For the selected time period, content data associated with one or more source identifiers can be analyzed 604. This can involve, for example, analyzing content identifiers determined for a specific content ID over the selected time period using a process such as discussed with respect to FIGS. 5A and 5B. In this example, the data will be grouped 606 by the identifying information, whereby data points for different content identifications will be separated into different groups, each group including all data points available for a respective content identification. Other approaches for performing counts or determining similar identifications can be used as well within the scope of the various embodiments. In this example, the number of data points in each group can be determined 608, which provides the number of devices that produced a fingerprint matching a specific instance of content. The number of data points in the different groups can be analyzed to determine 610 whether a consensus can be reached as to the identity of the content that was provided by a source at a specific point or period in time. As mentioned, this may involve a minimum number of devices, a minimum percentage of reporting devices, or a combination thereof, among other such options. If a consensus can be reached then the content identity (identifier or otherwise) can be stored 612 as associated with the source ID for the relevant time. If no consensus can be reached, additional processing can optionally be applied 614 to attempt to identify the content, such as by performing computer vision or other processing on a copy of the content obtained for the relevant time period. In at least some embodiments, another consensus determination can be made to determine 616 whether consensus can be reached for the identity. If not, the content schedule remains (with any generated fingerprints or content being discarded as appropriate) as is and the process continues for a different time period, etc. If a content identification is obtained, a content schedule for at least the relevant sources can be updated 618 using the relevant content identifiers or other such information. This schedule can then be provided or exposed to a number of different parties or entities, as permitted under the various embodiments, locations, and/or user preferences. The process can then continue for additional time periods as discussed herein. In at least some embodiments the consensus schedule can also be used as input to refine the consensus schedule itself. It is also possible to apply the schedule to sources and/or users that should have been identified as viewing consensus schedule content, but for some reason were not originally identified as watching specific content, etc.

Figure 7:
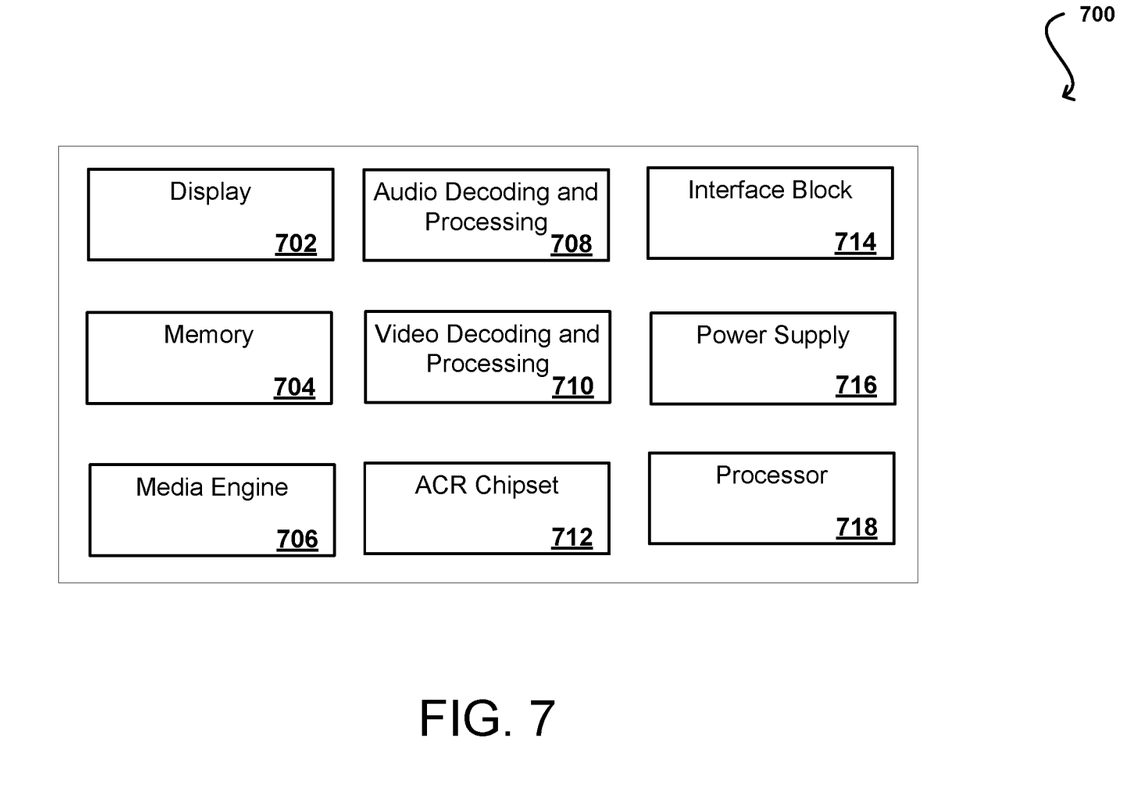
FIG. 7 illustrates components of an example computing device that can be utilized in accordance with various embodiments.

FIG. 7 illustrates an example user device 700, which may include display elements (e.g., display screens or projectors) for displaying consumer content. In various embodiments, the user device 700 may be a television, smart phone, computer, or the like as described in detail above. In various embodiments, the illustrated user device 700 includes a display 702. As will be appreciated, the display may enable the viewing of content on the user device 700. The display may be of a variety of types, such as liquid crystal, light emitting diode, plasma, electroluminescent, organic light emitting diode, quantum dot light emitting diodes, electronic paper, active-matrix organic light-emitting diode, and the like. The user device 700 further includes a memory 704. As would be apparent to one of ordinary skill in the art, the device can include many types of memory, data storage or computer-readable media, such as a first data storage for program instructions for execution by the at least one processor.

In various embodiments, the user device 700 includes a media engine 706. As used herein, the media engine 706 may include an integrated chipset or stored code to enable the application of various media via the user device 700. For example, the media engine 706 may include a user interface that the user interacts with when operating the user device 700. Further, the media interface 706 may enable interaction with various programs or applications, which may be stored on the memory 704. For example, the memory 704 may include various third party applications or programs that facilitate content delivery and display via the user device 700.

In various embodiments, the user device 700 further includes an audio decoding and processing module 708. The audio decoding and processing module 708 may further include speakers or other devices to project sound associated with the content displayed via the user device 700. Audio processing may include various processing features to enhance or otherwise adjust the user's auditory experience with the user device 700. For example, the audio processing may include feature such as surround-sound virtualization, bass enhancements, and the like. It should be appreciated that the audio decoding and processing module 708 may include various amplifiers, switches, transistors, and the like in order to control audio output. Users may be able to interact with the audio decoding and processing module 708 to manually make adjustments, such as increasing volume.

The illustrated embodiment further includes the video decoding and processing module 710. In various embodiments, the video decoding and processing module 710 includes components and algorithms to support multiple ATSC DTV formats, NTSC and PAL decoding, composite and S-Video inputs, and 2D adaptive filtering. Further, high definition and 3D adaptive filtering may also be supported via the video decoding and processing module 710. The video decoding and processing module 710 may include various performance characteristics, such as synchronization, blanking, and hosting of CPU interrupt and programmable logic I/O signals. Furthermore, the video decoding and processing module 710 may support input from a variety of high definition inputs, such as High Definition Media Interface and also receive information from streaming services, which may be distributed via an Internet network.

As described above, the illustrated user device 700 includes the ACR chipset 712, which enables an integrated ACR service to operate within the user device 700. In various embodiments, the ACR chipset 712 enables identification of content displayed on the user device 700 by video, audio, or watermark cues that are matched to a source database for reference and verification. In various embodiments, the ACR chipset 712 may include fingerprinting to facilitate content matching. The illustrated interface block 714 may include a variety of audio and/or video inputs, such as via a High Definition Media Interface, DVI, S-Video, VGA, or the like. Additionally, the interface block 714 may include a wired or wireless internet receiver. In various embodiments, the user device 700 further includes a power supply 716, which may include a receiver for power from an electrical outlet, a battery pack, various converters, and the like. The user device 700 further includes a processor 718 for executing instructions that can be stored on the memory 704.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a plurality of user devices, a set of fingerprint data, instances of the fingerprint data each including a representation of content received by a respective user device, each instance of fingerprint data being generated at least in part by analyzing the representation of the content received by the respective user device over a period of time;

comparing the instances of fingerprint against data representative of various instances of content to determine the instances of content associated with the instances of fingerprint data;

aggregating content data for each instance of content determined to be received from a respective content source, and by at least one of the user devices, over the period of time;

determining that a consensus criterion, corresponding to a statistically significant quantity of user devices from the plurality of user devices receiving the instances of content, is satisfied with respect to an instance of content for the period of time and the respective content source; and storing identity information for the instance of content along with an identifier for the respective content source, indicating that the instance of content was provided by the respective content source over the period of time.

2. The computer-implemented method of claim 1, further comprising:

generating a schedule including the identity information for multiple instances of content provided by a plurality of respective content sources for a time including at least the period of time.

3. The computer-implemented method of claim 1, wherein the fingerprint data is generated by hashing values representative of one or more frames of video content received by the respective user device.

4. The computer-implemented method of claim 1, further comprising:

determining the instances of content associated with the instances of fingerprint data using an automatic content recognition (ACR) process.

5. The computer-implemented method of claim 1, further comprising:

processing the aggregated content data for each instance of content determined to be received from a respective content source to reduce noise in the aggregated content data;

fitting a selected function to the aggregated content data to determine a start location and an end location for the aggregated content data over the period of time; and comparing a value for the aggregated content data, between the start and end locations, against the consensus criterion to determine whether the consensus criterion is satisfied.

6. The computer-implemented method of claim 1, wherein the consensus criterion includes at least one of a minimum number of user devices, a minimum fraction of reporting user devices, or at least a statistically significant percentage of reporting user devices for the period of time.

7. The computer-implemented method of claim 1, wherein at least a subset of the instances of fingerprint data are generated using a chipset installed on the respective user devices.

8. A computer-implemented method, comprising:

receiving data representative of an instance of content received by a respective device, the data indicating a content source from which the instance of content was received and a time of the receiving;

analyzing the received data with other data received from other devices and relating to the content source and the time of the receiving;

determining that a consensus criterion, corresponding to a statistically significant quantity of devices receiving the instances of content, is satisfied for the content source and the time of the receiving; and storing, associated with the time of the receiving and the content source, an identifier for the instance of content for which the consensus criterion is satisfied.

9. The computer-implemented method of claim 8, further comprising:

generating a schedule including identifiers for a plurality of instances of content, wherein each of the instances of content satisfied the consensus criterion for a respective content source at a respective time.

10. The computer-implemented method of claim 8, wherein the consensus criterion includes at least one of a minimum number of devices, a minimum fraction of reporting devices, or at least a statistically significant percentage of reporting devices for the period of time.

11. The computer-implemented method of claim 8, wherein the respective device is a user device including a chipset for generating the data representative of an instance.

12. The computer-implemented method of claim 11, wherein the data representative of the instance is generated by determining at least one hash value using pixel values of a frame of video representative of a segment of the content.

13. The computer-implemented method of claim 12, wherein the instance of content corresponds to one of a plurality of sequential segments of content received to the respective device from the content source.

14. The computer-implemented method of claim 8, further comprising:

applying at least one of an automatic content recognition (ACR) process or a trained neural network to the received data and the other data to determine the identifier for the instance of content.

15. The computer-implemented method of claim 8, further comprising:

processing aggregated content data for each instance of content determined to be received from a respective content source to reduce noise in the aggregated content data;

fitting a selected function to the aggregated content data to determine a start location and an end location for the aggregated content data over the period of time; and comparing a value for the aggregated content data against the consensus criterion to determine whether the consensus criterion is satisfied.

16. A computing device, comprising:

a processor; and memory including instructions that, when executed by the processor, cause the computing device to:

receive data representative of an instance of content received by a respective device, the data indicating a content source from which the instance of content was received and a time of the receiving;

analyze the received data with other data received from other devices and relating to the content source and the time of the receiving;

determine that a consensus criterion, corresponding to a statistically significant quantity of devices receiving the instances of content, is satisfied for the content source and the time of the receiving; and store, associated with the time of the receiving and the content source, an identifier for the instance of content for which the consensus criterion is satisfied.

17. The computing device of claim 16, wherein the instructions when executed further cause the computing device to:
   generate a schedule including identifiers for a plurality of instances of content, wherein each of the instances of content satisfied the consensus criterion for a respective content source at a respective time.

18. The computing device of claim 16, wherein the consensus criterion includes at least one of a minimum number of devices, a minimum fraction of reporting devices, or at least a statistically significant percentage of reporting devices for the period of time.

19. The computing device of claim 16, wherein the respective device is a user device including a chipset for generating the data representative of an instance, and wherein the data representative of the instance is generated by determining at least one hash value using pixel values of a frame of video content representative of a segment of the content.

20. The computing device of claim 16, wherein the instructions when executed further cause the computing device to:
   apply at least one of an automatic content recognition (ACR) process or a trained neural network to the received data and the other data to determine the identifier for the instance of content.

* * * * *